UNITED STATES PATENT OFFICE.

LOUIS C. JONES AND GEORGE N. TERZIEV, OF SYRACUSE, NEW YORK, ASSIGNORS TO THE SOLVAY PROCESS COMPANY, OF SOLVAY, NEW YORK, A CORPORATION OF NEW YORK.

PROCESS OF PRODUCING CHLORIN GAS.

1,236,570.  Specification of Letters Patent.  Patented Aug. 14, 1917.

No Drawing.  Application filed August 3, 1915. Serial No. 43,456.

*To all whom it may concern:*

Be it known that we, LOUIS C. JONES and GEORGE N. TERZIEV, citizens of the United States, residing at Syracuse, in the county of Onondaga and State of New York, have invented a new and Improved Process of Producing Chlorin Gas, of which the following is a specification.

Heretofore it has been proposed to produce chlorin gas by heating a mixture of ferric sulfate and sodium chlorid with access of air.

Such a process presents theoretically the advantages of simplicity of operation and cheapness of material, leaving as it does as a by-product iron oxid, which by treatment with sulfuric acid, or otherwise, might be converted into ferric sulfate to be again used in repeating the operation.

It has never been possible, however, to operate this with commercial success since the ferric sulfate has never been had in such physical form as to enable the realization of the theoretical output. Whether produced by the treatment of iron oxid with sulfuric acid or with sulfur trioxid gas, it is dense and not sufficiently reactive, or, when the oxid is treated with only a slight excess or even the theoretical quantity of sulfuric acid, a soft pasty mass is produced, difficult to handle, in the drying of which a considerable proportion of apparently loosely bound sulfur trioxid is driven off, with consequent deficiency of ferric sulfate in the dry product.

The success of our process depends upon the fact, which we have discovered, that if iron oxid be mixed with sodium chlorid and then subjected to the action of sulfur trioxid while heated to a suitable temperature, the sulfur trioxid is readily absorbed and sulfate of iron is formed in such a state as to be readily reactive in the subsequent reactions. The reason for the readily reactive condition of the result of the roast whether, a peculiar condition of the sulfate of iron formed or the intimate relation therewith of the alkali metal chlorid, which seems to act as a catalyst in promoting the reaction and is left in admixture with the sulfate cannot be stated with certainty.

During the treatment of the iron oxid with the sulfur trioxid gas the mass must be kept at a temperature of between 200° C. and 250° C. Below 200° C. the reaction takes place only slowly. Above 250° C. the reaction is rapid but there is evolution both of chlorin and sulfuryl chlorid ($SO_2Cl_2$) and other chlorinated sulfur compounds which destroy a considerable proportion of free chlorin. Furthermore above 250° the formation of ferric chlorid begins, which, being easily fusible, envelops the mass with a semi-liquid film which inhibits further action.

Between 200° and 250° the absorption of the sulfur trioxid and the formation of ferric sulfate goes on rapidly and without loss of chlorin and the process is continued until a mixture of ferric sulfate and ferric oxid in the proportion of approximately one to one is formed.

This is then mixed with a further proportion of sodium chlorid and heated with access of atmospheric air with a resulting production of chlorin gas according to the formula

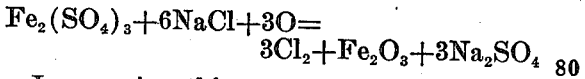
$$Fe_2(SO_4)_3 + 6NaCl + 3O = 3Cl_2 + Fe_2O_3 + 3Na_2SO_4$$

In carrying this part of our process into effect the ferric sulfate and sodium chlorid finely ground and dried (to prevent the formation of hydrochloric acid,) mixed together in combining proportions, are passed through a brick lined rotary furnace against a counted current of preheated atmospheric air and thereby subjected to a temperature of about 400° C. Too high an initial temperature should be avoided as at about 450° C. fusion will begin with consequent inconvenience in operation and loss of product. Toward the end of the reaction a higher temperature can be used without fusion since part of the chlorid has been decomposed and the remaining mixture is less readily fusible.

In this manner practically the theoretical amount of chlorin contained in the salt employed is evolved according to the reaction given above. The chlorin gas produced is conducted to a chamber for absorption in lime for producing chlorin of lime, or ordinary bleach, or otherwise employed as may be desired.

The powdered residue from the decomposing furnace is passed into a counter-current lixiviator from which a saturated solution of sulfate of soda, as a by-product, and a well washed ferric oxid emerge.

The ferric oxid is then dried and treated with sulfur trioxid gas in the manner above described to again form ferric sulfate to be used in repeating the operation.

It will be noted that in the formation of the ferric sulfate a very considerable proportion of ferric oxid remains mixed therewith. This, however, does not involve any loss of ferric oxid since such proportion remains substantially constant in the cycle of the operation and its presence is of advantage in the roast by enabling the use of a higher temperature without causing fusion of the salt.

What we claim as new and desire to secure by Letters Patent is:

1. The process of producing chlorin gas which consists in mixing an alkali metal chlorid with ferric sulfate, formed by treating ferric oxid mixed with an alkali metal chlorid with sulfur trioxid gas, and heating the mixture in the presence of oxygen.

2. The process of producing chlorin gas which consists in mixing sodium chlorid with ferric sulfate, formed by treating ferric oxid mixed with sodium chlorid with sulfur trioxid gas, and heating the mixture in the presence of the oxygen.

3. The hereinbefore described method of forming ferric sulfate which consists in treating a mixture of ferric oxid and sodium chlorid with sulfur trioxid at a temperature below that at which chlorin compounds will be evolved.

In testimony whereof, we have hereunto subscribed our names, this 26th day of July, A. D., 1915.

LOUIS C. JONES.
GEORGE N. TERZIEV.

Witnesses:
　EDWIN M. HUESTIS,
　H. DUANE BRUCE.